3,652,636
Patented Mar. 28, 1972

1

3,652,636
NITRILE CONTAINING STYRYL DYES
Horst Scheuermann and Matthias Seefelder, Ludwigshafen (Rhine), Germany, assignors to Badische Anilin- & Soda-Fabrik Aktiengesellschaft, Ludwigshafen (Rhine), Germany
No Drawing. Filed Aug. 13, 1968, Ser. No. 752,142
Claims priority, application Germany, Aug. 19, 1967,
P 15 69 674.9
Int. Cl. C07c 121/72
U.S. Cl. 260—465 D       3 Claims

ABSTRACT OF THE DISCLOSURE

A class of p-N-N-disubstituted styryl compounds which are methine or styryl dyes particularly useful for dyeing textile material of cellulose esters and synthetic polyamides or polyesters fast green-yellow shades. Particularly useful styryl dyes are those of the formula

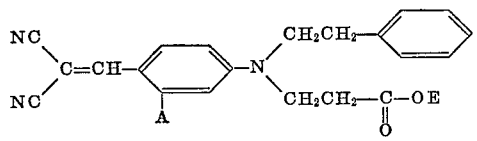

wherein A is hydrogen or methyl and E is methyl, ethyl, n-butyl or isobutyl.

This invention relates to dyes having the general Formula I:

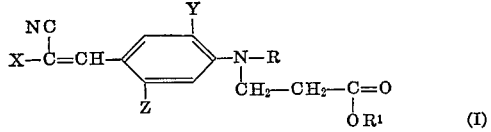

in which X denotes a cyano, carbalkoxy, or N-substituted or unsubstituted carbamoyl group, Y denotes a hydrogen atom or a low molecular weight alkyl or alkoxy group, Z denotes a hydrogen, chlorine or bromine atom, a trifluoromethyl group or a low molecular weight alkyl group, R denotes an unsubstituted or substituted alkyl, cycloalkyl or aralkyl group and $R^1$ denotes an unsubstituted or substituted alkyl or aralkyl group or a cycloalkyl group.

Examples of carbalkoxy groups and N-substituted carbamoyl groups X are carbomethoxy, carboethoxy, N-methylcarbamoyl, N,N-dimethylcarbamoyl, N-butylcarbamoyl, N-phenylcarbamoyl, N-(p-methoxy-, p-chloro-, m-chloro-, p-methyl-)phenylcarbamoyl or N-(p-dimethyl-sulfonamido)-phenylcarbamoyl.

Examples of suitable radicals Y (apart from hydrogen atoms) are methyl, ethyl, methoxy and ethoxy groups and examples of radicals Z, apart from the said radicals, are methyl and ethyl groups.

Examples of substituents R are methyl, ethyl, propyl, isopropyl, butyl, benzyl, β-phenylethyl, cyclohexyl, β-chloroethyl, β-cyanoethyl, β-methoxyethyl, β-butoxyethyl, β-acetoxyethyl and β-hydroxyethyl. Examples of $R^1$ are methyl, ethyl, propyl, isopropyl, n-butyl, isobutyl, tert-butyl and cyclohexyl.

Dyes which are particularly valuable industrially are those having the general Formula Ia:

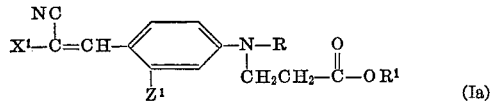

in which $Z^1$ denotes a hydrogen atom, a chlorine atom or a methyl group, $X^1$ denotes a cyano, carbomethoxy or

2 carboethoxy group, R denotes an alkyl group having one to four carbon atoms, a β-chloroethyl, β-cyanoethyl, β-methoxyethyl or β-acetoxyethyl group, a benzyl group or β-phenylethyl group and $R^1$ has the meanings given above.

Among the dyes having the general Formula Ia, those are preferred which have the general Formula Ib:

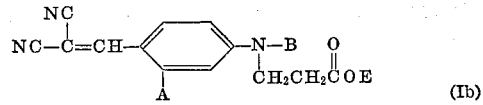

in which A denotes a hydrogen atom or a methyl group, B denotes a methyl, ethyl, butyl, benzyl or β-phenylethyl group and E denotes a methyl, ethyl, n-butyl or isobutyl group.

The dyes having the Formula I may be prepared for example by reaction of an aldehyde having the Formula II:

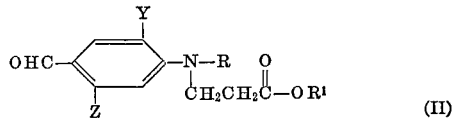

with a methylene compound having the Formula III:

in which X, Y, Z, R and $R^1$ have the above meanings.

Corresponding immonium salts having the general Formula IV:

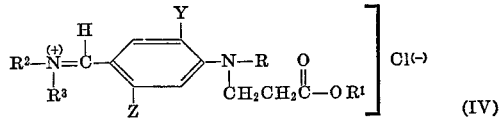

in which $R^2$ denotes an alkyl radical and $R^3$ denotes an alkyl or phenyl radical, may be used instead of the aldehydes having the Formula II.

Examples of aldehydes having the Formula II are:

p-(N-methyl-N-β-carbomethoxyethyl)-aminobenzaldehyde,
p-(N-methyl-N-β-carboethoxyethyl)-aminobenzaldehyde,
p-(N-ethyl-N-β-carbomethoxyethyl)-aminobenzaldehyde,
p-(N-butyl-N-β-carbomethoxyethyl)-aminobenzaldehyde,
p-(N-cyanoethyl-N-β-carbomethoxyethyl)-aminobenzaldehyde,
p-(N-isopropyl-N-β-carbobutoxyethyl)-aminobenzaldehyde,
p-(N-β-chloroethyl-N-carboisobutoxyethyl)-aminobenzaldehyde,
p-(N-ethyl-N-β-carbomethoxyethyl)-amino-o-chlorobenzaldehyde,
p-(N-butyl-N-β-carboethoxyethyl)-amino-o-chlorobenzaldehyde,
p-(N-benzyl-N-β-carboethoxyethyl)-amino-o-chlorobenzaldehyde,
p-(N-phenylethyl-N-β-carbomethoxyethyl)-amino-o-methylbenzaldehyde,
p-(N-butyl-N-β-carbomethoxyethyl)-amino-o-methylbenzaldehyde,
p-(N-methyl-N-β-carbomethoxyl)-amino-o-trifluoromethylbenzaldehyde,
4-(N-ethyl-N-β-carbomethoxyethyl)-amino-2-chloro-5-methoxybenzaldehyde,
4-(N-butyl-N-β-carboethoxyethyl)-amino-2-methyl-5-ethoxybenzaldehyde,
p-(N-methyl-N-β-carbocyclohexyloxyethyl)-amino-o-chlorobenzaldehyde,
p-(N-β-methoxyethyl-N-β-carbomethoxyethyl)-aminobenzaldehyde, p-(N-butoxyethyl-N-β-carbomethoxyethyl)-aminobenz-
aldehyde,
p-(N-acetoxyethyl-N-β-carbomethoxyethyl)-aminobenz-
aldehyde,
p-(N-β-hydroxy-N-β-carbobutoxyethyl)-aminobenzalde-
hyde,
p-(N-methyl-N-β-carbobenzyloxyethyl)-aminobenzalde-
hyde and
p-(N-ethyl-N-β-carbo-(β-hydroxyethoxy)-ethyl)-amino-
benzaldehyde.

Examples of immonium salts having the Formula IV are:

p-(N-ethyl-N-β-carbomethoxyethyl)-amino-N',N'-di-
methylbenzaldimmonium chloride
p-(N-butyl-N-β-carboethoxyethyl)-amino-o-chloro-
N',N'-dimethylbenzaldimmonium chloride or
p-(N-β-cyanoethyl-N-β-carbomethoxyethyl)-amino-o-
methyl-N',N'-dimethylbenzaldimmonium chloride.

Examples of compounds having the Formula IV are accessible for example by Vilsmeyer reaction from the appropriate aniline derivatives and N,N-disubstituted amide chlorides. Compounds having the Formula II are obtained from compounds having the Formula IV by hydrolysis.

Examples of methylene compounds having the Formula III are: malononitrile, methyl cyanoacetate, ethyl cyanoacetate, cyanoacetamide, cyanoaceto-N-methylamide, cyanoaceto - N,N - dimethylamide, cyanoacetanilide, cyano aceto-p-anisidide, cyanoaceto-p-chloroanilide, cyanoaceto-m-chloroanilide or cyanoacetocyclohexylamide.

An advantageous method of preparing compounds I consists in reacting compounds having the Formula II with compounds having the Formula III in the presence or absence of solvents at temperatures of from 20 to 150° C., preferably from 60° to 100° C., with or without the addition of a condensing agent.

Examples of suitable solvents for the reaction are alcohols such as methanol, ethanol and butanol; glycol ethers such as glycol monomethyl ether; dioxane; tetrahydrofuran; benzene; chlorobenzene; toluene; dimethylformamide; dimethylsulfoxide; N-methylpyrrolidone and chloroform.

Examples of condensing agents suitable for accelerating the reaction are piperidine, morpholine, triethylamine, diethylamine, hexamethylenimine, potassium hydroxide, sodium hydroxide, potassium alcoholate and sodium alcoholate.

The new dyes are suitable for dyeing and printing textile material of polyesters, synthetic polyamides and particularly of secondary cellulose acetate and cellulose triacetate. The dyeings are distinguished by outstanding light fastness and very good fastness to washing and sublimation. The dyes are also eminently suitable for dyeing at temperatures higher than 100° C. and leave the wool component undyed in union fabrics of wool and polyester.

When the new dyes are mixed with blue dyes of the anthraquinone series they give green dyeings having excellent light fastness on cellulose triacetate fibrous material.

Furthermore the dyes have good solubility in organic solvents and are suitable for coloring surface coatings, oils and synthetic fibers in bulk and also for coloring polystyrene and polyethylene. Moreover the dyes are soluble with fiber-forming polymers in organic solvents and may be used in the conventional manner in spin-dyeing methods.

The invention is illustrated by the following examples. Parts and percentages are by weight.

EXAMPLE 1

117.5 parts of p - (N - ethyl-N-β-carbomethoxyethyl)-aminobenzaldehyde and 36 parts of malononitrile in 250 parts of methanol are boiled under reflux for one hour with an addition of 2 parts of piperidine. The styryl dye having the formula:

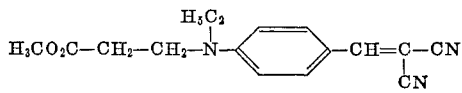

crystallizes out upon cooling as yellow crystals. After they have been recrystallized from methanol the compound melts at 87° to 88° C.

The substance dyes polyester and polyamide fibers and cellulose triacetate silk clear greenish yellow shades having very good fastness to light, wet treatments and sublimation.

100 parts of a cellulose triacetate silk cloth is heated for forty-five minutes at 75° to 80° C. in a dye liquor containing 1.5 parts of the said dye, 2 parts of the adduct of 47 moles of ethylene oxide to 1 mole of castor oil and 4000 parts of water. A greenish yellow dyeing having very good light and wet fastness is obtained.

The aldehyde required for the synthesis of this dye is obtained in the following way:

140 parts of phosgene is added at 0° to 5° C. to 95 parts of dimethylformamide in 500 parts of chloroform. After the whole has been stirred for one hour at room temperature, 207 parts of N-ethyl-N-β-carbomethoxyethylaniline is added; then the whole is heated for four hours at 60° to 65° C. The mixture is then poured onto 1000 parts of ice, the whole made alkaline with 50% caustic soda solution and extracted with chloroform. The chloroform layer is separated, dried and concentrated under subatmospheric pressure. Distillation of the residue gives 160 parts (68% of the theory) of p-(N-ethyl-N-β-carbomethoxyethyl)-aminobenzaldehyde having a boiling point of 170° to 173° C. at 0.1 mm.

EXAMPLE 2

163 parts of p - N - isopropyl-N-β-carbobutoxyethyl)-amino-o-chlorobenzaldehyde and 36 parts of malononitrile in 200 parts of methanol are boiled under reflux for two hours. Upon cooling, the dye first separates as a viscous oil which crystallizes after some hours. The styryl dye having the formula:

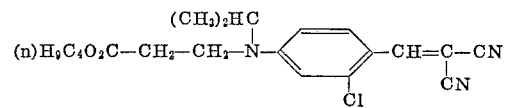

is obtained in yellow crystals; the compound melts at 61° to 62° C.

The dye, dyes polyester and polyamide fibers and also cellulose triacetate silk in clear greenish yellow shades having very good light, wet and sublimation fastness.

100 parts of a polyester fibrous material is heated for ninety minutes at 130° C. in a dye liquor having 1.8 parts of the said dye, 1.5 parts of the sodium salt of a condensation product of β-naphthalenesulfonic acid with formaldehyde, 1.5 parts of acetic acid and 3000 parts of water. A greenish yellow dyeing having good light, wash and sublimation fastness is obtained.

The aldehyde required for the production of the dye is prepared by Vilsmeyer reaction analogously to the description in Example 1. It is obtained in a yield of 64% with a boiling point of from 200° to 205° C. at 0.05 mm.

EXAMPLE 3

117.5 parts of p - (N-ethyl-N-β-carbomethoxyethyl)-aminobenzaldehyde and 95 parts of cyanaceto-p-anisidide are heated for one hour at 60° to 65° C. in 250 parts of methanol with the addition of 2 parts of piperidine. When the mixture is cooled, the styryl dye having the formula:

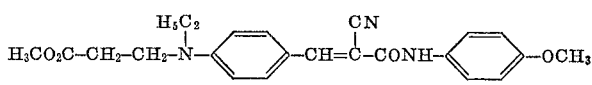

crystallizes in yellow crystals. The compound melts at

90° to 91° C. after it has been recrystallized from methanol.

The substance dyes polyester and polyamide fibers and cellulose triacetate silk clear greenish yellow shades having very good light, wet and sublimation fastness.

100 parts of a synthetic polyamide cloth is heated for one hour at 90° C. in a dye liquor consisting of 0.8 part of the styryl dye, 2 parts of the sodium salt of the sulfuric ester of Ocenol (technical oleyl alcohol) and 4000 parts of water. A greenish yellow dyeing having very good wet and sublimation fastness and good light fastness is obtained.

Production of the aldehyde required for preparing the styryl dye is described in Example 1.

EXAMPLE 4

132 parts of p-(N-β-methoxyethyl-N-β-carbomethoxyethyl)-aminobenzaldehyde and 60 parts of ethyl cyanoacetate are heated for two hours at 80° to 85° C. in 300 parts of dioxane with an addition of 2 parts of piperidine. The styryl dye having the formula:

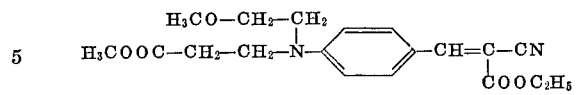

crystallizes out in yellow crystals having a melting point of 100° to 101° C. upon cooling.

The substance dyes polyester and polyamide fibers and cellulose triacetate silk greenish yellow shades having very good wash, sublimation and light fastness.

The aldehyde required for the production of the styryl dye is prepared by the Vilsmeyer reaction described in Example 1. It is obtained in a yield of 72% and has a boiling point of 183° to 186° C. at 0.02 mm.

The dyes set out in the following table, which also give greenish yellow dyeings, may be produced by methods analogous to those described:

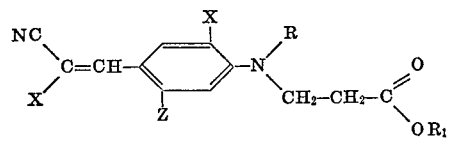

| Number: | X | Y | Z | R | $R_1$ |
|---|---|---|---|---|---|
| 1 | CN | H | H | $CH_3$ | $CH_3$ |
| 2 | CN | H | H | $CH_3$ | $C_2H_5$ |
| 3 | CN | H | H | $CH_3$ | $n-C_4H_9$ |
| 4 | CN | H | H | $CH_3$ | $i-C_4H_9$ |
| 5 | CN | H | H | $C_2H_5$ | $-C_2H_5$ |
| 6 | CN | H | H | $C_2H_5$ | $i-C_4H_9$ |
| 7 | CN | H | H | $n-C_4H_9$ | $CH_3$ |
| 8 | CN | H | H | $n-C_4H_9$ | $C_2H_5$ |
| 9 | CN | H | H | $n-C_4H_9$ | $n-C_4H_9$ |
| 10 | $CO_2C_2H_5$ | H | H | $CH_3$ | $CH_3$ |
| 11 | $CO_2C_2H_5$ | H | H | $CH_3$ | $C_2H_5$ |
| 12 | $CO_2C_2H_5$ | H | H | $CH_3$ | $n-C_4H_9$ |
| 13 | $CO_2C_2H_5$ | H | H | $CH_3$ | $i-C_4H_9$ |
| 14 | $CO_2C_2H_5$ | H | H | $C_2H_5$ | $-C_2H_5$ |
| 15 | $CO_2C_2H_5$ | H | H | $C_2H_5$ | $i-C_4H_9$ |
| 16 | $CO_2C_2H_5$ | H | H | $n-C_4H_9$ | $CH_3$ |
| 17 | $CO_2C_2H_5$ | H | H | $n-C_4H_9$ | $C_2H_5$ |
| 18 | $CO_2C_2H_5$ | H | H | $n-C_4H_9$ | $n-C_4H_9$ |
| 19 | CN | H | H | $-CH_2-CH_2-Cl$ | $CH_3$ |
| 20 | CN | H | H | $-CH_2-CH_2-Cl$ | $n-C_4H_9$ |
| 21 | CN | H | H | $-CH_2-CH_2-CN$ | $C_2H_5$ |
| 22 | CN | H | H | $-CH_2CH_2-OCH_3$ | $C_2H_5$ |
| 23 | $CO_2C_2H_5$ | H | H | $-CH_2-CH_2-Cl$ | $CH_3$ |
| 24 | $CO_2C_2H_5$ | H | H | $-CH_2-CH_2-Cl$ | $n-C_4H_9$ |
| 25 | $CO_2C_2H_5$ | H | H | $-CH_2-CH_2-CN$ | $C_2H_5$ |
| 26 | $CO_2C_2H_5$ | H | H | $-CH_2-CH_2-OCH_3$ | $C_2H_5$ |
| 27 | CN | H | Cl | $CH_3$ | $CH_3$ |
| 28 | CN | H | H | $CH_3$ | $C_2H_5$ |
| 29 | CN | H | H | $CH_3$ | $n-C_4H_9$ |
| 30 | CN | H | H | $CH_3$ | $i-C_4H_9$ |
| 31 | CN | H | H | $C_2H_5$ | $-C_2H_5$ |
| 32 | CN | H | H | $C_2H_5$ | $i-C_4H_9$ |
| 33 | CN | H | H | $n-C_4H_9$ | $CH_3$ |
| 34 | CN | H | H | $n-C_4H_9$ | $C_2H_5$ |
| 35 | CN | H | Cl | $n-C_4H_9$ | $n-C_4H_9$ |
| 36 | CN | H | $CH_3$ | $CH_3$ | $CH_3$ |
| 37 | CN | H | $CH_3$ | $CH_3$ | $C_2H_5$ |
| 38 | CN | H | $CH_3$ | $CH_3$ | $n-C_4H_9$ |
| 39 | CN | H | $CH_3$ | $CH_3$ | $i-C_4H_9$ |
| 40 | CN | H | $CH_3$ | $C_2H_5$ | $-C_2H_5$ |
| 41 | CN | H | $CH_3$ | $C_2H_5$ | $i-C_4H_9$ |
| 42 | CN | H | $CH_3$ | $n-C_4H_9$ | $CH_3$ |
| 43 | CN | H | $CH_3$ | $n-C_4H_9$ | $C_2H_5$ |
| 44 | CN | H | $CH_3$ | $n-C_4H_9$ | $n-C_4H_9$ |
| 45 | $CO_2C_2H_5$ | H | Cl | $CH_3$ | $CH_3$ |
| 46 | $CO_2C_2H_5$ | H | Cl | $CH_3$ | $C_2H_5$ |
| 47 | $CO_2C_2H_5$ | H | Cl | $CH_3$ | $n-C_4H_9$ |
| 48 | $CO_2C_2H_5$ | H | Cl | $CH_3$ | $i-C_4H_9$ |
| 49 | $CO_2C_2H_5$ | H | Cl | $C_2H_5$ | $-C_2H_5$ |
| 50 | $CO_2C_2H_5$ | H | Cl | $C_2H_5$ | $i-C_4H_9$ |
| 51 | $CO_2C_2H_5$ | H | Cl | $n-C_4H_9$ | $CH_3$ |
| 52 | $CO_2C_2H_5$ | H | Cl | $n-C_4H_9$ | $C_2H_5$ |
| 53 | $CO_2C_2H_5$ | H | Cl | $n-C_4H_9$ | $n-C_4H_9$ |
| 54 | $CO_2C_2H_5$ | H | $CH_3$ | $CH_3$ | $CH_3$ |
| 55 | $CO_2C_2H_5$ | H | $CH_3$ | $CH_3$ | $C_2H_5$ |
| 56 | $CO_2C_2H_5$ | H | $CH_3$ | $CH_3$ | $n-C_4H_9$ |
| 57 | $CO_2C_2H_5$ | H | $CH_3$ | $CH_3$ | $i-C_4H_9$ |
| 58 | $CO_2C_2H_5$ | H | $CH_3$ | $C_2H_5$ | $-C_2H_5$ |
| 59 | $CO_2C_2H_5$ | H | $CH_3$ | $C_2H_5$ | $i-C_4H_9$ |
| 60 | $CO_2C_2H_5$ | H | $CH_3$ | $n-C_4H_9$ | $CH_3$ |
| 61 | $CO_2C_2H_5$ | H | $CH_3$ | $n-C_4H_9$ | $C_2H_5$ |
| 62 | $CO_2C_2H_5$ | H | $CH_3$ | $n-C_4H_9$ | $n-C_4H_9$ |
| 63 | CN | $OCH_3$ | H | $CH_3$ | $CH_3$ |
| 64 | CN | $OCH_3$ | Cl | $CH(CH_3)_2$ | $C_2H_5$ |
| 65 | $CONH-C_6H_5$ | H | H | $C_2H_5$ | |
| 66 | 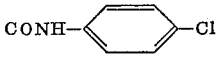 | H | Cl | $n-C_4H_9$ | $n-C_4H_9$ |

TABLE—Continued

| | X | Y | Z | R | R₁ |
|---|---|---|---|---|---|
| 67 | CONH—⟨⟩—OCH₃ | H | Cl | n-C₄H₉ | CH₃ |
| 68 | CN | H | H | —CH₂—C₆H₅ | CH₃ |
| 69 | CN | H | Cl | —CH₂—CH₂—C₆H₅ | CH₃ |
| 70 | CO₂C₂H₅ | H | Cl | —CH₂—CH₂—C₆H₅ | C₂H₅ |
| 71 | CO—NH—CH₃ | H | H | CH₃ | CH₃ |
| 72 | CONH—⟨H⟩ | H | H | C₂H₅ | C₂H₅ |

EXAMPLE 73

187 parts of p-(N-benzyl-N-β-carboisobutoxyethyl)-amino-o-chlorobenzaldehyde and 60 parts ethyl cyanoacetate are heated for one hour at 75° to 80° C. in 300 parts of ethanol with an addition of 3 parts of piperidine, and then cooled. The styryl dye having the formula:

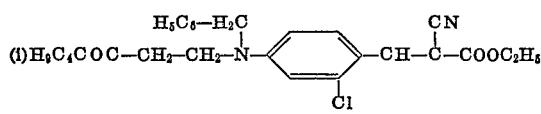

is suction-filtered, washed with ethanol/water and dried. The yield is 224 parts of dye (96% of the theory) having a melting point of 93° to 94° C.

The substance dyes polyester and polyamide fibers and cellulose triacetate silk greenish yellow shades having very good wash, sublimation and light fastness.

The aldehyde required for the production of the dye is prepared by the Vilsmeier reaction described in Example 1. It is obtained in a yield of 68% and has a boiling point of 236° to 238° C. at 0.01 mm.

EXAMPLE 74

162 parts of p-(N-β-phenylethyl-N-β-carbomethoxyethyl)-amino-o-methylbenzaldehyde is heated in 350 parts of methanol together with 36 parts of malononitrile and 2 parts of piperidine for one hour at 60° C. and allowed to cool. 177 parts (95% of the theory) of the styryl dye having the formula:

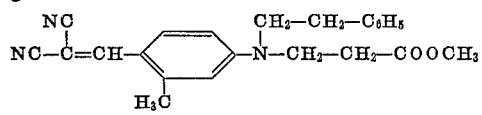

crystallizes out in yellow crystals. The compound melts at 103° to 104° C.

The dye, dyes polyester and polyamide fibers and cellulose triacetate silk clear greenish yellow shades having very good light, wet and sublimation fastness.

The aldehyde required for production of the dye is prepared by the process described in Example 1. It is obtained in a yield of 70% and has a melting point of 62° to 64° C.

EXAMPLE 75

152 parts of p-(N-cyclohexyl-N-β-carboethoxyethyl)-aminobenzaldehyde, 36 parts of malononitrile and 2 parts of piperidine in 200 parts of ethanol are heated for two hours at 75° to 80° C. Upon cooling, 162 parts (92% of the theory) of the styryl dye having the formula:

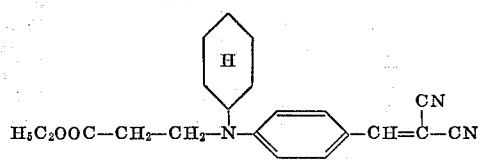

crystallizes out in yellow crystals. The compound melts at 120° to 122° C.

It dyes polyester fibers and cellulose triacetate silk greenish yellow shades having very good fastness.

The aldehyde required for the production of the dye is prepared by the process described in Example 1. It is obtained in a yield of 61% and has a boiling point of 200° to 201° C. at 0.01 mm.

The compounds characterized in the following table by the substituents given are other analogous dyes which also give greenish yellow dyeings:

| Number | X | Y | Z | R | R₁ |
|---|---|---|---|---|---|
| 76 | CN | H | CH₃ | —CH₂—C₆H₅ | CH₃ |
| 77 | CN | H | CH₃ | —CH₂—C₆H₅ | C₂H₅ |
| 78 | CN | H | Cl | —CH₂—C₆H₅ | CH₃ |
| 79 | CN | H | H | —CH₂—CH₂—C₆H₅ | CH₃ |
| 80 | CN | H | H | —CH₂—CH₂—C₆H₅ | C₂H₅ |
| 81 | CN | H | CH₃ | —CH₂—CH₂—C₆H₅ | C₂H₅ |
| 82 | CN | H | CH₃ | —CH₂—CH₂—C₆H₅ | n-C₄H₉ |
| 83 | CN | H | Cl | —CH₂—CH₂—C₆H₅ | C₂H₅ |
| 84 | CN | H | Cl | —CH₂—CH₂—C₆H₅ | n-C₄H₉ |
| 85 | CN | H | H | —CH₂—CH₂—C₆H₅ | n-C₄H₉ |
| 86 | CO₂C₂H₅ | H | H | —CH₂—CH₂—C₆H₅ | CH₃ |
| 87 | CN | H | H | —CH₂—CH₂—C₆H₅ | C₂H₅ |
| 88 | CN | H | CH₃ | —CH₂—CH₂—C₆H₅ | CH₃ |
| 89 | CN | H | CH₃ | —CH₂—CH₂—C₆H₅ | C₂H₅ |
| 90 | CN | H | H | ⟨H⟩ | CH₃ |
| 91 | CN | H | CH₃ | Same as above | CH₃ |
| 92 | CN | H | CH₃ | do | C₂H₅ |
| 93 | CN | H | Cl | do | CH₃ |
| 94 | CN | H | Cl | do | C₂H₅ |

We claim:
1. A styryl dye of the formula

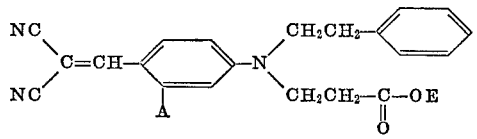

wherein A is hydrogen or methyl and E is methyl, ethyl, n-butyl or isobutyl.

2. The dye having the formula:

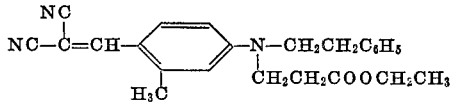

3. The dye having the formula:

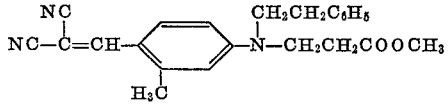

References Cited

UNITED STATES PATENTS

| 2,583,551 | 1/-952 | Dickey et al. | 260—465 |
| 2,583,614 | 1/1952 | Taylor et al. | 260—465 |
| 2,811,544 | 10/1957 | Kartinos | 260—465 |
| 3,141,018 | 7/1964 | Straley et al. | 260—465 |

HENRY R. JILES, Primary Examiner

C. F. WARREN, Assistant Examiner

U.S. Cl. X.R.

260—471 R

UNITED STATES PATENT OFFICE
CERTIFICATE OF CORRECTION

Patent No. 3,652,636   Dated March 28, 1972

Inventor(s) Horst Scheuermann and Matthias Seefelder

It is certified that error appears in the above-identified patent and that said Letters Patent are hereby corrected as shown below:

Column 4, line 7, "870" should read -- 87° --.

Column 6, lines 20 to 25, that portion of the formula reading
" 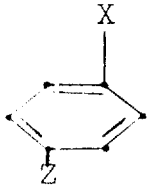 " should read -- 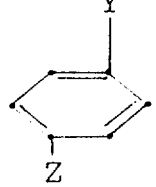 --;

in the table, under "Z", numbers 28 through 34, each occurrence, "H" should read -- Cl --.

Column 7, lines 21 to 25, "(1)H₉C₄COC-CH₂-CH₂-N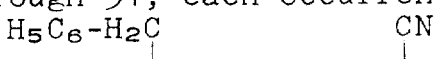"

should read --
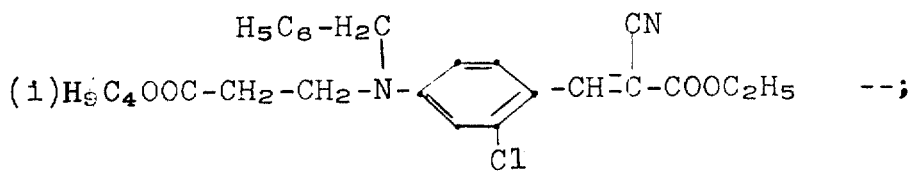 --;

line 52, "dye, dyes" should read -- dye dyes --.

Column 8, in the table, under "X", each occurrence, numbers 87 through 89, "CN" should read -- CO₂C₂H₅ --.

Signed and sealed this 21st day of November 1972.

(SEAL)
Attest:

EDWARD M. FLETCHER, JR.
Attesting Officer

ROBERT GOTTSCHALK
Commissioner of Patents